US005722758A

United States Patent [19]

Huang

[11] Patent Number: 5,722,758

[45] Date of Patent: Mar. 3, 1998

[54] VEHICLE LIGHT FIXTURE WITH A QUICK DETACHABLE SOCKET

[75] Inventor: Nan Huang, Rancho Palos Verdes, Calif.

[73] Assignee: Grand General Accessories Manufacturing Inc., Compton, Calif.

[21] Appl. No.: 628,861

[22] Filed: Apr. 5, 1996

[51] Int. Cl.$^{6}$ .......... B60Q 1/00

[52] U.S. Cl. .......... 362/61; 362/226; 362/311; 362/353

[58] Field of Search .......... 362/61, 226, 311, 362/363, 457, 374, 375, 353, 361; 313/318.01, 318.09, 318.1, 318.12; 439/318, 546, 549, 616

[56] References Cited

U.S. PATENT DOCUMENTS

| | | | |
|---|---|---|---|
| 2,853,595 | 9/1958 | Baldwin . | |
| 2,992,323 | 7/1961 | Fletcher . | |
| 3,047,829 | 7/1962 | Mouat | 362/363 |
| 3,511,982 | 5/1970 | Salter . | |
| 3,717,758 | 2/1973 | Willis . | |
| 4,794,500 | 12/1988 | Bradley | 362/226 |
| 4,819,133 | 4/1989 | Kochi et al. | 362/226 |
| 4,829,408 | 5/1989 | Haydu | 362/61 |
| 4,926,301 | 5/1990 | Liverance et al. | 362/226 |
| 5,010,455 | 4/1991 | Luallin et al. | 362/61 |
| 5,029,057 | 7/1991 | Devir et al. | 362/226 |
| 5,361,191 | 11/1994 | Matsuzaki et al. | 362/226 |

*Primary Examiner*—Thomas M. Sember
*Attorney, Agent, or Firm*—Thomas I. Rozsa; Tony D. Chen

[57] ABSTRACT

The present invention vehicle light fixture comprises a hollow lens and a quick detachable socket. The hollow lens has a base permanently affixed at the bottom. The base has an opening thereto. A light bulb is installed in the quick detachable socket such that the detachable socket can be partially inserted into the opening and interlocks itself within the opening, thereby maintaining the light bulb within the hollow dome lens. To replace a malfunctioned light bulb, the detachable socket can be unlocked by rotating the socket which loosens itself from the opening at the base, and removed from the base so that the malfunctioned light bulb can be replaced with a new light bulb without the entire light fixture being replaced.

4 Claims, 2 Drawing Sheets

VEHICLE LIGHT FIXTURE WITH A QUICK DETACHABLE SOCKET

BACKGROUND OF THE INVENTION

1. Field of the Invention

The present invention generally relates to the field of vehicle accessories. More particularly, the present invention relates to the field of light fixtures, e.g., turn signal lights, marker lights and etc., for vehicles.

2. Description of the Prior Art

In the prior art, most vehicle light fixtures are comprised of a dome lens or any suitable type of lens, a base fixedly attached to the bottom of the lens, and a socket having a light bulb and permanently fixed to the base. The disadvantage with these prior art vehicle light fixtures is that when the light bulb malfunctions, there is no way to replace the malfunctioned light bulb itself and therefore, the entire light fixture has to be replaced to replace the light bulb.

The following eight (8) prior art patents were uncovered in the pertinent field of the present invention:

1. U.S. Pat. No. 2,853,595 issued to Baldwin on Sep. 23, 1958 for "Vehicle Light" (hereafter "the Baldwin Patent");

2. U.S. Pat. No. 2,992,323 issued to Fletcher on Jul. 11, 1961 for "Electric Light Fixture" (hereafter "the Fletcher Patent");

3. U.S. Pat. No. 3,511,982 issued to Salter on May 12, 1970 for "Lamp Holder" (hereafter "the Salter Patent");

4. U.S. Pat. No. 3,717,758 issued to Willis on Feb. 20, 1973 for "Tail Light Adapter Assembly" (hereafter "the Willis Patent");

5. U.S. Pat. No. 4,794,500 issued to Bradley on Dec. 27, 1988 for "Composite Headlamp bulb Retaining Mechanism" (hereafter "the Bradley Patent");

6. U.S. Pat. No. 4,829,408 issued to Haydu on May 9, 1989 for "Retainer For Replaceable Headlamp Bulb" (hereafter "the Haydu Patent");

7. U.S. Pat. No. 5,010,455 issued to Luallin et al. on Apr. 23, 1991 for "Headlamp Assembly" (hereafter "the Luallin Patent"); and 8. U.S. Pat. No. 5,029,057 issued to Devir et al. on Jul. 2, 1991 for "Clipped Together Lamp Base" (hereafter "the Devir Patent").

The Baldwin Patent discloses a vehicle light. It is similar to prior art vehicle light fixtures, wherein a light bulb is enclosed within a permanently closed and sealed chamber.

The Fletcher Patent discloses an electric light fixture. It comprises a canopy, a reflector, and a socket element which has two separate sections, a socket cap section which carries the wiring terminals and a socket body section which carries the light unit. The socket cap section is secured to and supported by the canopy, while the socket body section is mounted on the reflector. The reflector is detachably mounted on the socket cap section.

The Salter Patent discloses a lamp holder. It has a pair of opposed projecting cam lugs which are adapted to engage with a circular aperture on a printed circuit board.

The Willis Patent discloses a tail light adapter assembly which is a T-shaped configuration. A socket holds a bulb such that both form the crossbar of the T-shaped configuration. A standard lamp base forms the leg of the T-shaped configuration, and an electrical cable extends away from the assembly with leads interconnecting the contacts in the socket and the lamp base.

The Bradley Patent discloses a composite headlamp bulb retaining mechanism. It comprises a seal and a flange with spaced tabs extending therefrom. The mechanism allows for the bulb body to be oriented in a predetermined configuration and inserted into the aperture of a retaining ring.

The retaining ring is snap fitted for permanent installation onto the socket structure of a reflector housing and contains cantilevered finger elements with ramped surfaces to interfere with the flange tabs during rotation of the inserted bulb while in the socket.

The Haydu Patent discloses a retainer for replaceable headlamp bulb. The retainer is formed with a plurality of radially outwardly extending flanges which are movable into precut slits formed in a plurality of circumferentially spaced projections on a reflector for securing the retainer to the reflector.

The Luallin Patent discloses a headlamp assembly. It comprises a reflector with a socket opening which is adapted to receive a replaceable low beam light bulb assembly. The light bulb assembly is supported by and maintained in a locked position on the reflector by a retainer.

The Devir Patent discloses a clipped together lamp base. It comprises an insertable lamp which uses a press sealed lamp capsule as a light source. The lamp is assembled from a bulb, a bulb holder and a lamp base. The bulb clips to the bulb holder, which in turn clips to the lamp base.

It is desirable to have a very efficient and also very effective design and construction of a vehicle light fixture with a quick detachable socket such that when the light bulb malfunctions, it can easily be replaced with a new light bulb so that the entire vehicle light fixture does not need to be replaced.

SUMMARY OF THE INVENTION

The present invention is a unique vehicle light fixture apparatus. The light fixture apparatus solves the prior art problem where the light bulb can easily be replaced when it malfunctions.

The light fixture apparatus comprises a hollow dome lens or any suitable type of lens, a base permanently affixed to the bottom of the lens and a quick detachable socket having a light bulb therein. The base has an opening wherein the detachable socket can be partially inserted into the opening and interlocks itself within the opening, thereby maintaining the light bulb within the hollow dome lens. To replace a malfunctioned light bulb, the detachable socket can be unlocked by rotating the socket which loosens itself from the opening at the base, and removed from the base so that the malfunctioned light bulb can be replaced with a new light bulb without the entire light fixture being replaced.

It is therefore an object of the present invention to provide a vehicle light fixture with a detachable socket such that when a light bulb malfunctions, the detachable socket can be detached from the light fixture so that the light bulb can be replaced, thereby eliminating the need to replace the entire light fixture.

It is a further object of the present invention to provide a vehicle light fixture which comprises a hollow dome shaped lens with a bottom opening and a detachable socket which is partially inserted into the opening and interlocks itself within the opening, thereby maintaining the light bulb within the hollow dome shaped lens. When the light bulb malfunctions, the detachable socket can be unlocked by rotating the socket which loosens itself from the bottom opening, and is removed from the base so that the malfunctioned light bulb can be replaced with a new light bulb without the entire light fixture being replaced.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated.

DESCRIPTION OF THE PREFERRED EMBODIMENT

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

Figure 1:
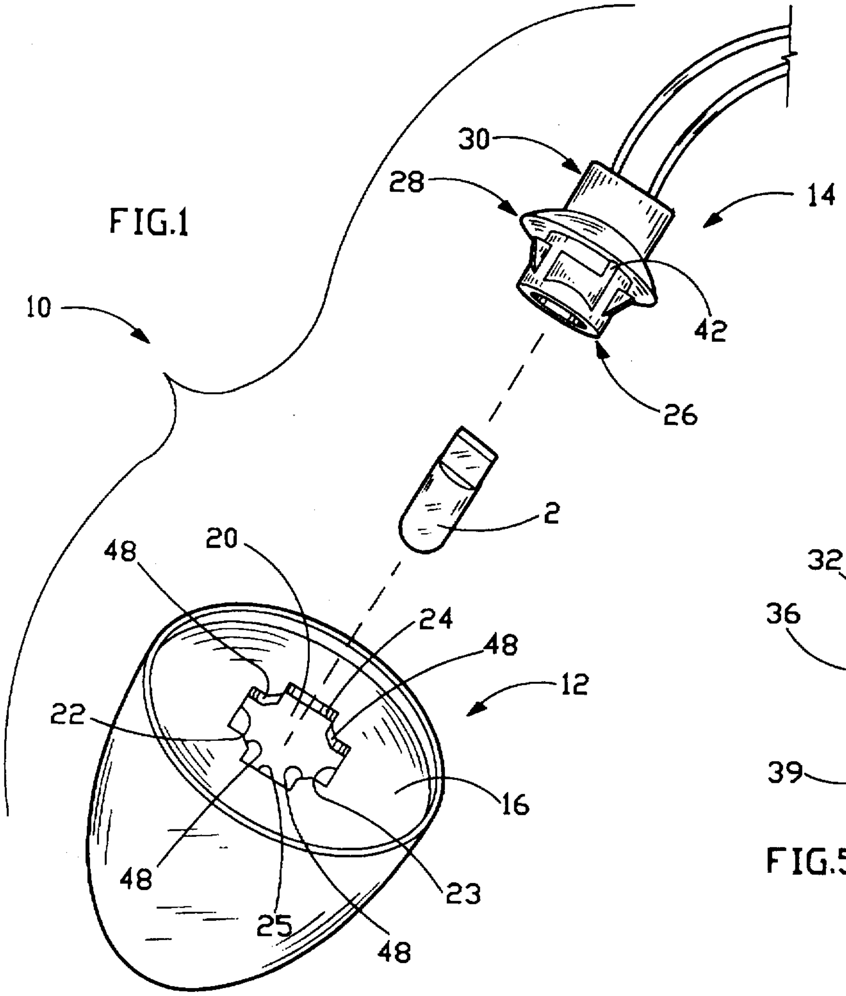
FIG. 1 is an exploded view of the present invention vehicle light fixture apparatus.
Figure 5:
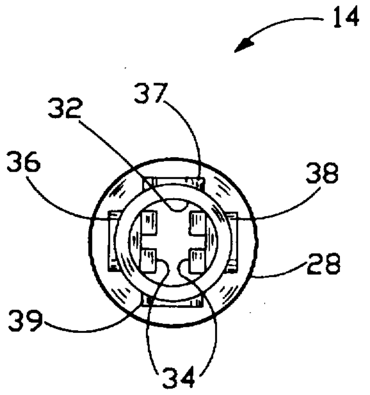
FIG. 5 is a top plan view of the quick detachable socket of the present invention.
Figure 2:
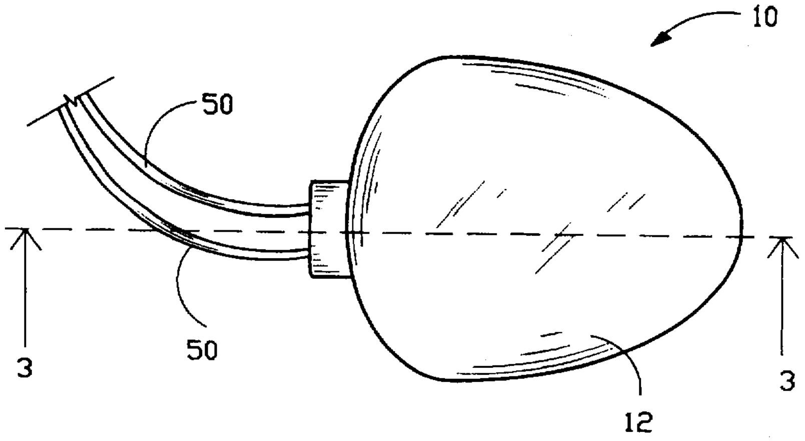
FIG. 2 is a perspective view of the present invention vehicle light fixture apparatus.
Figure 3:
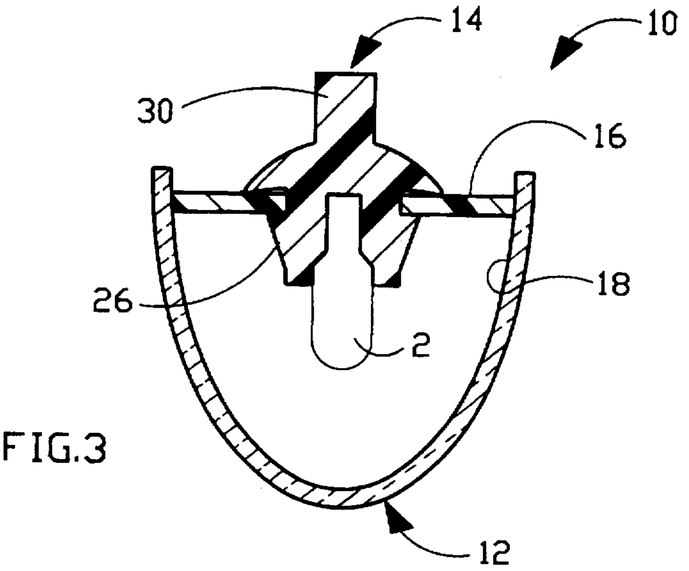
FIG. 3 is a cross-sectional view taken along line 3—3 of FIG. 2.
Figure 7:
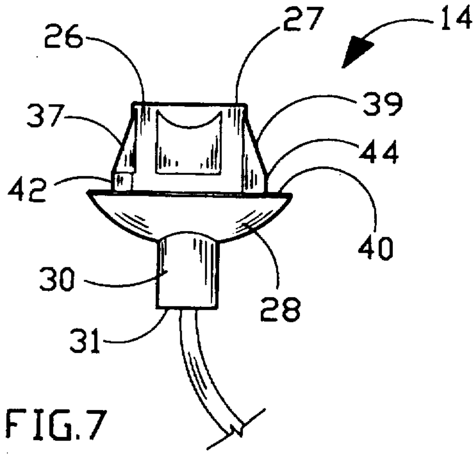
FIG. 7 is a side elevational view of the quick detachable socket of the present invention.
Figure 6:
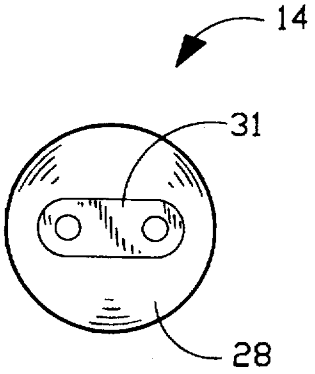
FIG. 6 is a bottom plan view of the quick detachable socket of the present invention.
Figure 4:
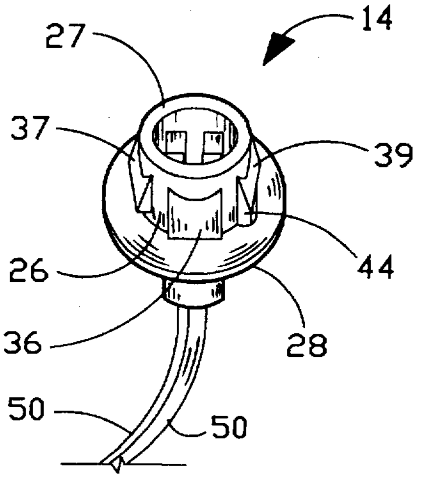
FIG. 4 is a perspective view of a quick detachable socket of the present invention.

Referring to FIGS. 1, 2 and 3, there is shown at 10 the present invention vehicle light fixture apparatus which comprises a generally hollow dome shaped lens 12 and a quick detachable socket 14. A circular shaped bottom plate 16 is permanently affixed to an interior surface 18 of the hollow dome shaped lens 12 and located remote from the tip of the lens 12. The bottom plate 16 has a central cross shaped aperture 20 with two pairs of opposite slots 22, 23, 24 and 25.

Referring to FIGS. 4 through 7, there is shown the quick detachable socket 14 of the present invention vehicle light fixture apparatus. The quick detachable socket 14 has a generally cylindrical shaped proximal portion 26 with a proximal end 27, a wide circular middle portion 28, and a generally rectangular shaped distal portion 30 with a distal end 31. The proximal end 27 has a cavity 32 for receiving a light bulb 2 (see FIGS. 1, 3 and 5). Terminal connections 34 are installed within the cavity 32 for providing continuity to the light bulb. These terminal connections 34 are installed in the conventional way known to one skilled in the art.

The proximal portion 26 of the quick detachable socket 14 is integrally formed with four radially outwardly extending and circumferentially spaced apart flange tabs 36, 37, 38, and 39. These flange tabs 36 through 39 are spaced from an upper surface 40 of the wide circular middle portion 28. Two of the flange tabs 37 and 39 are integrally formed with two opposite edge legs 42 and 44, such that the legs 42 and 44 extend downwardly to form with the upper surface 40 of the wide circular middle portion 28. The two opposite edge legs 42 and 44 do not extend the entire width of the flange tabs 37 and 39, but only extend approximately one-quarter (¼) inch of the width of the flange tabs 37 and 39 (see FIG. 1).

The quick detachable socket 14 further has a pair of electrical wires 50 protruding outwardly from the distal end 31 and connecting to the terminal connections 34, where a power source can be provided through the electrical wires 50.

The quick detachable socket 14 is installed by inserting the proximal portion 26 into the central cross shaped aperture 20 of the bottom plate 16 of the dome shaped lens 12 such that the flange tabs 36, 37, 38 and 39 pass through the two pairs of opposite slots 22, 23, 24 and 25 respectively. Then the distal portion 30 of the quick detachable socket 14 is rotated in a clockwise direction to interlock the proximal portion 26 to the bottom plate 16, where the two opposite edge legs 42 and 44 engage protruding bosses 48 located within the central cross shaped aperture 20. The two opposite edge legs 42 and 44 allow the quick detachable socket 14 to be secured to the bottom plate 16 of the dome shaped lens 12, where the bottom plate 16 is located between the flange tabs 36, 37, 38 and 39, and the upper surface 40 of the wide circular middle portion 28.

Referring to FIG. 3, when the light bulb 2 malfunctions, the quick detachable socket 14 can be unlocked by rotating the distal portion 30 in a counter-clockwise direction which loosens itself from the central cross shaped aperture 20 of the bottom plate 16 of the hollow dome shaped lens 12. The flange tabs 36, 37, 38 and 39 pass through the pair of opposites slots 22, 23, 24 and 25 respectively, such that the malfunctioned light bulb 2 can be replaced with a new light bulb.

The vehicle light fixture apparatus 10 further comprises hardware means (not shown) for installation to a vehicle.

It will be appreciated that the hollow dome shaped lens 12 is not limited to the illustration shown in FIGS. 1, 2 and 3. It is emphasized that while the dome shaped lens is preferred, it is also within the spirit and scope of the present invention to have a multiplicity of different shaped lenses.

The present invention conforms to conventional forms of manufacture or any other conventional way known to one skilled in the art, and is of simple construction and is easy to use. By way of example, the quick detachable socket can be made of semi-soft plastic material or any suitable material.

Defined in detail, the present invention is a vehicle light fixture apparatus, comprising: (a) a generally hollow dome shaped lens and a bottom plate attached to the lens, the bottom plate having a central cross shaped aperture with two pairs of opposite slots; (b) a quick detachable socket having a cylindrical shaped proximal portion with a proximal end, a wide circular middle portion, and a rectangular shaped distal portion with a distal end, the proximal end having a cavity for receiving a light bulb; (c) four equally spaced apart flange tabs integrally formed on and protruding away from the proximal portion of the quick detachable socket and spaced from the wide circular middle portion of the socket; (d) two opposite edge legs integrally formed with two of the four flange tabs respectively such that the two opposite edge legs extend downwardly to form with an upper surface of the wide circular middle portion of the quick detachable socket; and (e) the quick detachable socket installed to the hollow dome shaped lens by inserting the proximal portion into the central cross shaped aperture of the bottom plate such that a respective two of the four flange tabs respectively pass through the two pairs of opposite slots of the cross shaped aperture and rotating the distal portion which interlocks the proximal portion to the bottom plate, where the two opposite edge legs engage protruding bosses located within the central cross shaped aperture, thereby securing the quick detachable socket thereto, the bottom plate of the lens located between the multiplicity of spaced apart flange tabs and the wide circular middle portion of the quick detachable socket; (f) whereby when the light bulb malfunctions, the quick detachable socket can be unlocked by rotating the distal portion of the quick detachable socket which loosens itself from the central cross shaped aperture of the bottom plate, and be removed therefrom such that the malfunctioned light bulb can be replaced with a new light bulb without replacing the dome shaped lens and the bottom plate.

Defined broadly, the present invention is a light fixture apparatus, comprising: (a) a hollow lens and a base attached to the hollow lens, the base having an aperture with a pair of slots; (b) a socket having a proximal portion with a proximal end, a wide middle portion and a distal portion with a distal end; (c) at least two flange tabs integrally formed on and protruding away from the proximal portion of the socket and spaced from the wide middle portion of the socket; (d) at least one edge leg integrally formed with one of the at least two flange tabs such that the at least one edge leg extend downwardly to form with the wide middle portion of the socket; and (e) the socket installed to the hollow lens by inserting the proximal portion into the aperture of the base such that the at least two flange tabs respectively pass through the pair of slots of the aperture and rotating the distal portion which interlocks the proximal portion to the base, where the at least one edge leg engages a protruding boss located within the aperture, thereby securing the socket thereto; (f) whereby when the light bulb malfunctions, the socket can be unlocked by rotating the distal portion of the socket which loosens itself from the aperture of the base, and to removed therefrom such that the malfunctioned light bulb can be replaced with a new light bulb without replacing the hollow lens and the base.

Defined more broadly, the present invention is an apparatus, comprising: (a) a generally dome shaped lens and a base attached to the lens, the base having an aperture with at least one slot; (b) a socket having a proximal end, a widened middle portion and a distal end; (c) at least one flange attached to the socket and located adjacent to the proximal end; and (d) the socket installed to the dome shaped lens by inserting the proximal end into the aperture of the base such that the at least one flange passes through the at least one slot of the aperture and rotating the distal end which interlocks the proximal end to the base; (e) whereby when the light bulb malfunctions, the socket can be unlocked by rotating the distal end of the socket which loosens itself from the aperture of the base, and be removed therefrom such that the malfunctioned light bulb can be replaced with a new light bulb without replacing the dome shaped lens and the base.

Of course the present invention is not intended to be restricted to any particular form or arrangement, or any specific embodiment disclosed herein, or any specific use, since the same may be modified in various particulars or relations without departing from the spirit or scope of the claimed invention hereinabove shown and described of which the apparatus shown is intended only for illustration and for disclosure of an operative embodiment and not to show all of the various forms or modifications in which the present invention might be embodied or operated.

The present invention has been described in considerable detail in order to comply with the patent laws by providing full public disclosure of at least one of its forms. However, such detailed description is not intended in any way to limit the broad features or principles of the present invention, or the scope of patent monopoly to be granted.

What is claimed is:

1. A vehicle light fixture apparatus, comprising:

a. a generally hollow dome shaped lens and a bottom plate attached to the lens, the bottom plate having a central cross shaped aperture with two pairs of opposite slots;

b. a quick detachable socket having a cylindrical shaped proximal portion with a proximal end, a wide circular middle portion, and a rectangular shaped distal portion with a distal end, the proximal end having a cavity for receiving a light bulb;

c. four equally spaced apart flange tabs integrally formed on and protruding away from said proximal portion of said quick detachable socket and spaced from said wide circular middle portion of said socket;

d. two opposite edge legs integrally formed with two of said four flange tabs respectively such that the two opposite edge legs extend downwardly to form with an upper surface of said wide circular middle portion of said quick detachable socket; and e. said quick detachable socket installed to said hollow dome shaped lens by inserting said proximal portion into said central cross shaped aperture of said bottom plate such that a respective two of said four flange tabs respectively pass through said two pairs of opposite slots of said cross shaped aperture and rotating said distal portion which interlocks said proximal portion to said bottom plate, where said two opposite edge legs engage protruding bosses located within said central cross shaped aperture, thereby securing said quick detachable socket thereto, said bottom plate of said lens located between said multiplicity of spaced apart flange tabs and said wide circular middle portion of said quick detachable socket;

f. whereby when the light bulb malfunctions, said quick detachable socket can be unlocked by rotating said distal portion of said quick detachable socket which loosens itself from said central cross shaped aperture of said bottom plate, and be removed therefrom such that the malfunctioned light bulb can be replaced with a new light bulb without replacing said dome shaped lens and said bottom plate.

2. The vehicle light fixture apparatus in accordance with claim 1 further comprising means for installing said vehicle light fixture apparatus to a vehicle.

3. The vehicle light fixture apparatus in accordance with claim 1 wherein said distal end of said quick detachable socket has electrical wires protruding outwardly for connecting to a power source.

4. The vehicle light fixture apparatus in accordance with claim 1 further comprising terminal connections installed within said cavity at said proximal end of said quick detachable socket for providing continuity to the light bulb.

* * * * *